Oct. 9, 1934.            P. W. DIETER                1,976,485
                         JOURNAL BEARING
                        Filed Jan. 8, 1934
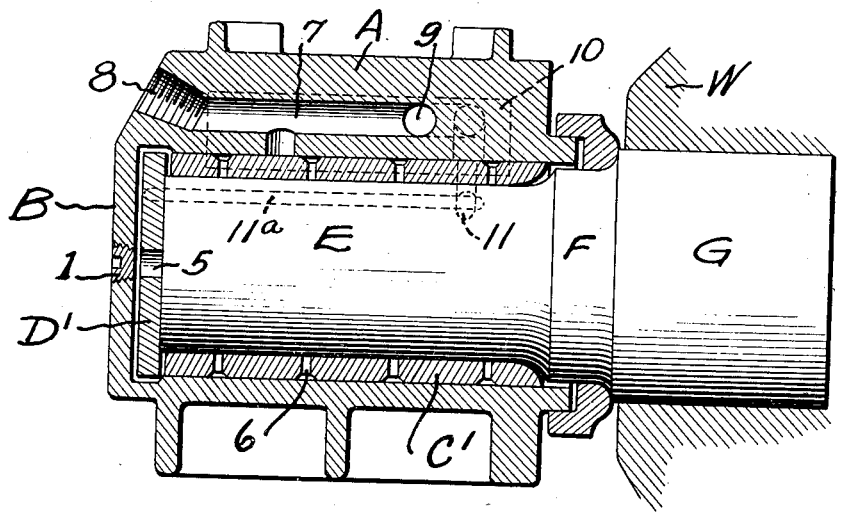
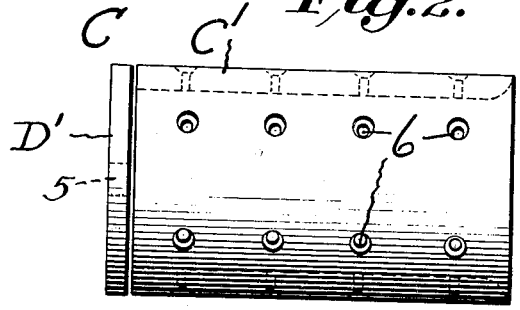
Inventor
Paul W. Dieter,
By [signature]
                Attorney Patented Oct. 9, 1934

1,976,485

UNITED STATES PATENT OFFICE 1,976,485

JOURNAL BEARING

Paul W. Dieter, New York, N. Y., assignor to P. W. Dieter, Inc., New York, N. Y., a corporation of Delaware Original application April 18, 1933, Serial No. 666,768. Divided and this application January 8, 1934, Serial No. 705,807

2 Claims. (Cl. 308—81)

This invention relates to journal bearings for railway rolling stock, steam and electric, and more particularly to novel improvements in bearings of the floating bushing type, disclosed in my co-pending application, Serial No. 666,768, filed April 18, 1933 of which the present case is a division.

Heretofore, it has been customary to provide the floating bushing with a flange at its inner (or wheel) end adapted to take the lateral thrust of the axle against and between the wheel hub and journal box. This construction has been particularly useful and advantageous for the inside style or type of bearings used on locomotives.

However, for the outside style or type of bearings required for tenders and railway cars, for both steam and electric railway service, it has been found that instead of imposing the lateral thrust of the axle on a flange at the inner end of the bushing, such thrust may be taken care of by providing the bushing with a thrust wall located between the outer end of the bearing and the inside face of the outer end wall or cover of the journal box.

Accordingly, the present invention has primarily in view the provision of a floating sleeve or bushing which may be fitted over the journal portion of the axle and the box then assembled on the bushing so that the end wall or head thereof will be arranged between the outer extremity of the axle and the inside face of an outer wall of the box or casing.

A special object of the invention is to provide a bearing construction wherein the bushing includes a floating cylindrical sleeve or body and an end thrust disk not connected with the body, thereby to be readily renewable, said disk when mounted for service being positioned between the end of the cylindrical sleeve and axle and the inside face of the housing or box so as to float or move in all directions relative to the end of the sleeve and axle as well as the inside face of the housing.

A preferred and practical embodiment of the invention is shown in the accompanying drawing, in which:—

Figure 1 is a vertical sectional view illustrating the application of the present improvements to a journal box.

Figure 2 is a detail elevation of a bushing made in two parts, namely, a cylindrical body and a separate end thrust wall.

Similar reference characters designate corresponding parts throughout the several figures of the drawing.

According to the embodiment of the invention shown in the drawing, the same essentially consists of a journal box or casing designated generally as A and having an outer end wall B, the said box or casing being adapted to receive a floating bushing C comprising a sleeve or cylindrical body C' having perforations 6, and an end thrust wall or disk D'.

As shown in Figure 1, the cylindrical body C' having therein the openings 6 is adapted to receive the journal portion E of the car axle which also includes the dust guard diameter F and wheel diameter G for receiving the wheel W.

Referring to the box structure more in detail, it will be observed that the outer wall B of the box may be provided with a removable plug 1 which may be located opposite the opening 5 in the end thrust disk D' to provide an inspection opening which permits of viewing the end of the axle, and also permits of cleaning or flushing out the entire bearing in the event that a pressure flushing unit or system is connected with the opening when the plug 1 is removed. The opening 5 also serves as a pocket for grease.

The upper part of the box or casing is provided with a main grease supply passage 7 having one end threaded as at 8 to receive a closure plug while the opposite end communicates through the medium of the channels or ports 9 with the grease storage chambers 10 which in turn communicate through the ports 11 with the channels 11ª in the sides of the box casing and which lead to the zone of the end thrust disk D' thereby to insure the furnishing of lubricant or grease to the end thrust disk.

The bearing as a whole functions as set forth in my co-pending application aforesaid. However, it may again be pointed out that the end thrust wall or disk D', according to the present invention is made separate from the cylindrical body portion C' of the bushing, so that it may not only be readily removable and, therefore, renewable, but so that the thrust wall or thrust disk D' may be made of harder material than the body of the bushing. That is to say, the cylindrical perforated body C' may be made of a bronze or other bearing composition while the end thrust disk D' may be made of steel or other hard metal. This arrangement also permits the use of metal disks or shims when desired, to take up any unusual play that may exist between the end of the bushing or axle and the inner face of the outer wall B of the box.

In this embodiment of the invention, the thrust wall or disk D' is intended to be free of the body C' in the sense that each part may move or rotate without reference to the other. The floating disk is confined between the end of the axle and the side face of the housing and is free to move in all directions relative to the end of the cylindrical body and axle and the inside face of the housing so that wear between the parts is materially distributed over the disk, axle, and perforated sleeve or body.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:—

1. A journal bearing comprising a housing having an end wall, a floating bushing in said housing and comprising a cylindrical perforated sleeve adapted to receive the journal portion of an axle, a renewable floating end thrust disk mounted in operating position between the end of the axle and the inside face of the housing so as to move in all directions relative to the end of the axle and said inside face of the housing, and means for supplying lubricant to said sleeve and to said disk.

2. A journal bearing comprising a housing having an end wall, a floating bushing in said housing and comprising a cylindrical perforated sleeve adapted to receive the journal portion of an axle, a renewable floating end thrust disk having a circular periphery and mounted in operating position between the end of the axle and the inside face of the housing so as to move in all directions relative to the end of the axle and said inside face of the housing, and means for supplying lubricant to said sleeve and to said disk.

PAUL W. DIETER.